United States Patent [19]
Jurasek

[11] 3,735,654
[45] May 29, 1973

[54] BLANKING MACHINE VACUUM SYSTEM

[75] Inventor: Walter R. Jurasek, Gustine, Calif.

[73] Assignee: Avoset Food Corporation, Oakland, Calif.

[22] Filed: Jan. 24, 1972

[21] Appl. No.: 220,311

[52] U.S. Cl. ..................83/100, 83/132, 83/140, 83/152
[51] Int. Cl. ..................B26d 7/20, B26d 7/06
[58] Field of Search..................83/100, 99, 98, 152, 83/132, 133, 129, 140, 402

[56] References Cited
UNITED STATES PATENTS

| | | | |
|---|---|---|---|
| 2,366,728 | 1/1945 | Handley | 83/100 |
| 3,330,092 | 7/1967 | Hill | 83/152 |
| 3,550,491 | 12/1970 | Wingard | 83/99 |
| 3,611,854 | 10/1971 | Gilev et al. | 83/140 |

Primary Examiner—Donald R. Schran
Attorney—Smith, Harding, Earley & Follimer

[57] ABSTRACT

A fixed upper die member of a blanking press has manifold means and means to exhaust air from said manifold means. Passages extend from the manifold means through the lower face of the upper die member to urge a web which passes below the upper die member into contact therewith. The press is associated with a generally conventional blanking machine having means to step feed a continuous web to the press below the upper die member and above a reciprocable lower die member, a conveyor adjacent the upper die member and means to remove the waste portion of the web. Upper punches conforming to the tops of the cup are fixed with the lower die being moved upwardly beyond them to cut the tops of the cups clear of the web, the said tops being held to the punches by a cup stripper.

2 Claims, 6 Drawing Figures

3,735,654
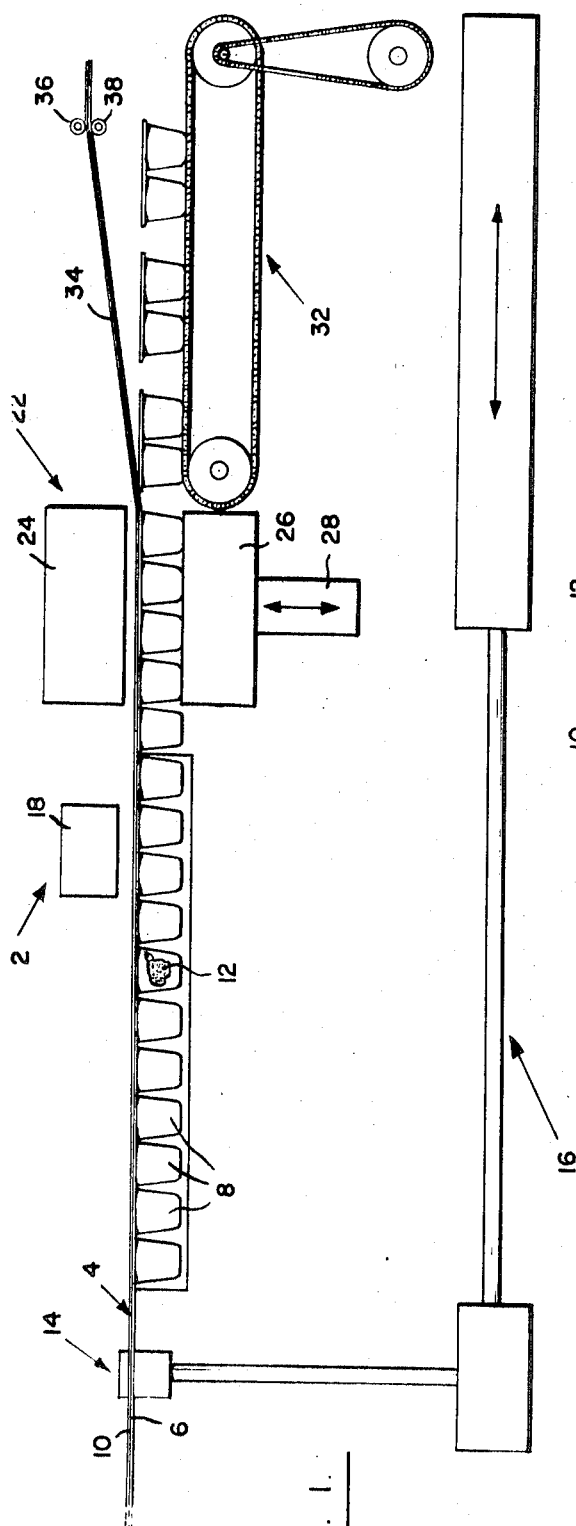
FIG. I.
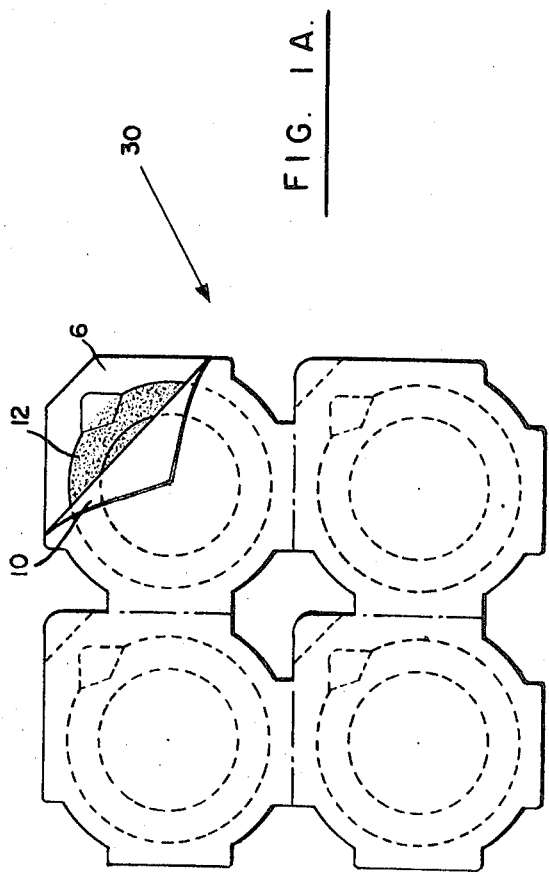
FIG. IA.

BLANKING MACHINE VACUUM SYSTEM

BACKGROUND OF THE INVENTION

Blanking machines having means to step feed a continuous web to a blanking press which have a fixed upper die member and a reciprocable lower die member, a conveyor adjacent the upper die member, and means to remove the waste portion of the web are well known to the art. A typical such machine is marketed by Anderson Bros. Manufacturing Company of Rockford, Illinois and is known in the trade as the ANDERSON FORMSEAL machine. This machine also incorporates means for draw forming cups from a plastic sheet, filling the cups with a liquid, and covering the cups with a covering sheet. The aspect of this machine of particular interest here blanks out (cuts out) the filled and covered cups in groups of four. After the press opens the cutout groups of four cups are pushed out onto a conveyor adjacent the blanking press by the immediately following uncut cups of the web. While it is desirable to have each cup individually blanked out of the web, with the FORMSEAL machine in question it is not possible to do this since it results in a chaotic jumbling of the individual cups as they are being pushed from the press to the conveyor.

It is, therefore, the object of this invention to eliminate this problem in the FORMSEAL machine and other continuous web blanking machines by providing for means insuring an orderly transfer of numerous individual parts such as cups, blanked out from a continuous web at a high rate of speed without the necessity for the use of reciprocating parts that must pass between the upper and lower die members of the press which has the added benefit of eliminating the danger of closing the die members on such reciprocating parts and thus, causing substantial damage.

SUMMARY OF THE INVENTION

A conventional blanking machine having means to step feed a continuous web to a blanking press with a fixed upper die member and a reciprocable lower die member has the upper fixed die member modified to have manifold means and means to exhaust air therefrom. Downwardly extending passageways in the upper die member communicate with the manifold means and extend through the lower face of the upper die member to provide a vacuum urging the material passing under the upper die member into contact therewith. Upper punches conforming to the tops of the cups are fixed with the lower die being moved upwardly beyond them to cut the tops of the cups clear of the web, the said tops being held to the punches by a cup stripper.

DESCRIPTION OF THE DRAWINGS

FIG. 1 is a schematic view of a prior art blanking machine;

FIG. 1A is a plan view of a group of four blanked out cups;

PRIOR ART

Figure 2:
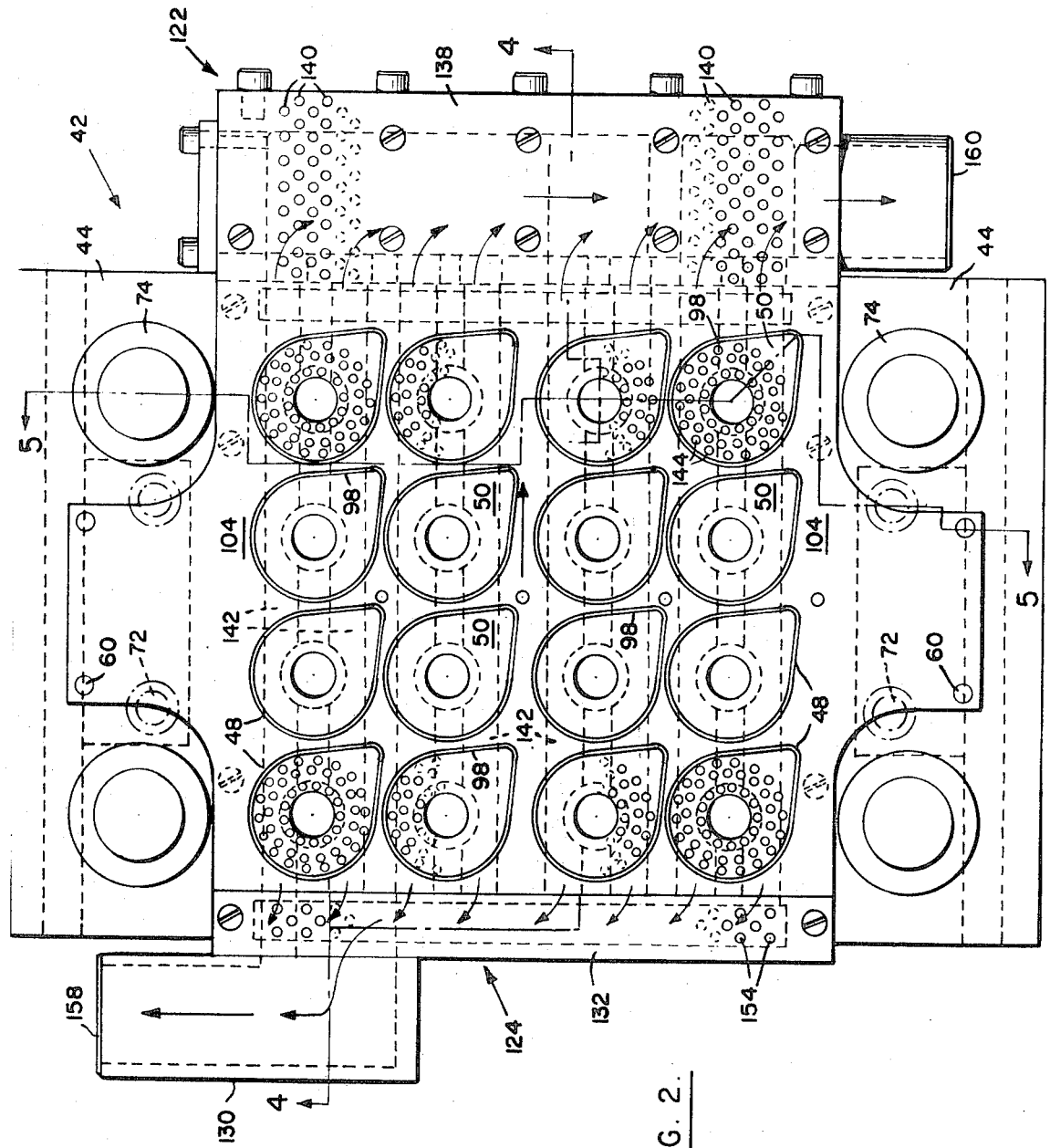
FIG. 2 is a bottom plan view of a fixed upper die member of a blanking press modified in accordance with the invention.

Referring to FIG. 1, a prior art blanking machine 2 is shown in association with a continuous web 4 comprising a plastic sheet 6 having cups 8 formed therein and covered by a covering sheet 10. Cups 8 contain, for example, cream indicated at 12. Web 4 is advanced stepwise by a gripper mechanism indicated at 14 which is reciprocated by a ram indicated at 16 as controlled by electric eye means indicated at 18. A blanking press 22 has an upper die member 24 which is fixed and a lower die member 26 which is reciprocated by a ram indicated at 28. Press 22 cuts out the cups in groups of four, one of said groups being shown at 30 in FIG. 1A. When the press 22 opens and the web 4 is advanced for the next blanking operation, each severed group 30 is pushed onto endless belt conveyor 32, each group having sufficient stability to avoid being tumbled by this operation. The waste portion 34 of the web passes through take-up rollers 36 and 38 enroute to a waste collection station. This machine is well known to the art being widely used commercially and hence, need not be described in greater detail.

PREFERRED EMBODIMENT OF THE INVENTION

This invention fundamentally involves a modification of the blanking press of the above described prior art blanking machine to insure an orderly transfer of individual blanked out parts to the endless conveyor and, in the particular case illustrated above, to permit cutting out each individual cup and provide for its orderly transfer to the endless conveyor.

Figure 5:
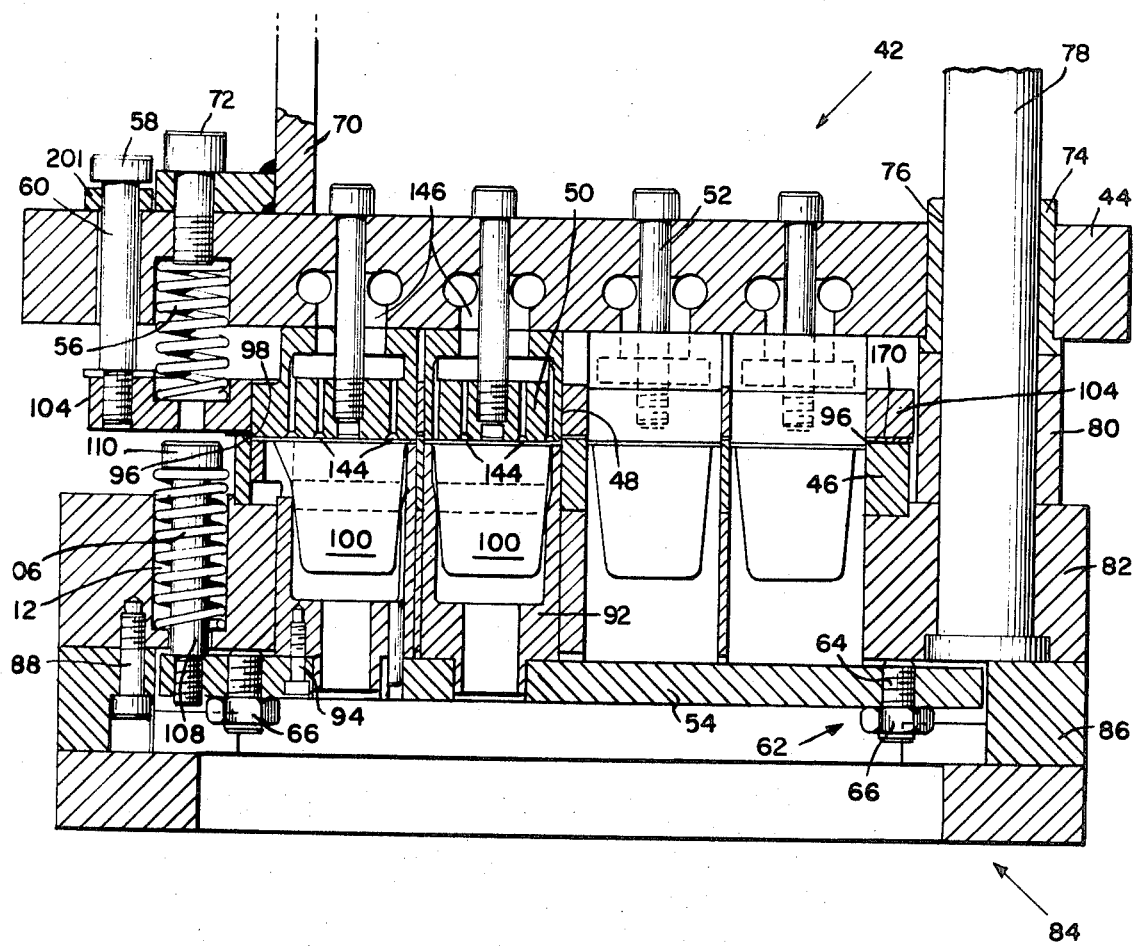
FIG. 5 is a vertical section taken on the planes indicted by the line 5—5 in FIG. 2 showing both the upper and lower die members with the lower die member being in its upper most position just after the cutting operation.

Referring first to FIG. 2, a fixed upper die member 42 has a support plate 44 carrying a skeleton stripper plate 104 having shaped openings 48 each for the reception of a punch member 50 to strip scrap material from each punch. As best seen in FIG. 5, each punch member 50 is securely anchored to support plate 44 by a bolt 52. Stripper plate 104 is mounted for vertical movement by studs 60 having headed ends 58 which are threadably secured to stripper plate 104 which is biased downwardly by compression coil springs 56 which extend between plate 44 and plate 104. The downward movement of plate 104 is limited by steel washer stops 201 on studs 60. Referring still to FIG. 5, support plate 44 is fixedly mounted to a support indicated at 70 by means of machine screws, one of which is shown at 72.

Figure 3:
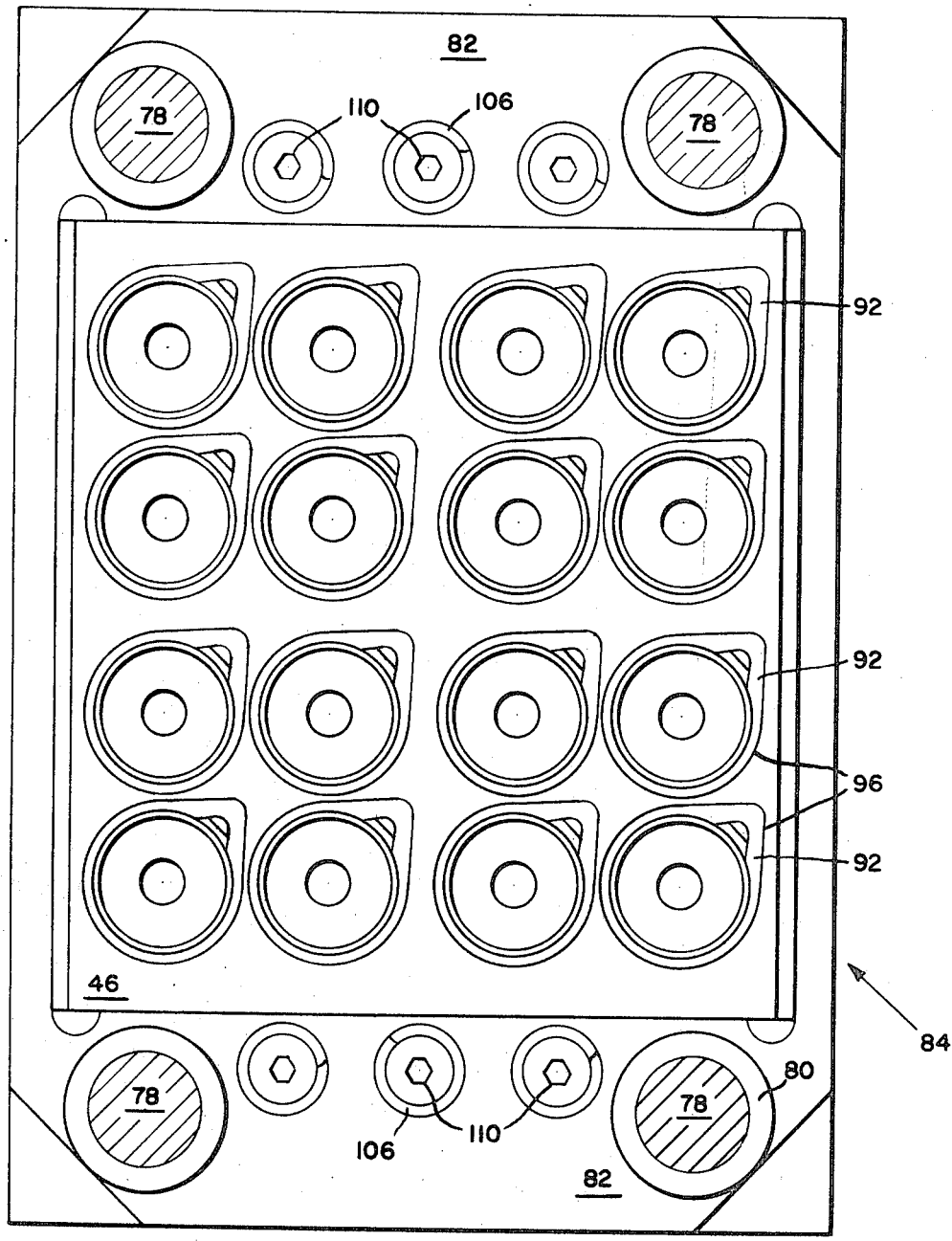
FIG. 3 is a top plan view of a reciprocable lower die member of a blanking press.

The fixed upper die member has a bushing 74 mounted in opening 76 for the sliding accommodation of a ram rod 78 (the ram not being shown) which is fixedly secured in a ring 80 and in a base plate 82 of lower reciprocable die member 84 and which carries die plate 46. As seen in FIG. 3, lower die member 84 has three additional ram rods 78 (the rams not being shown) which are similarly mounted and similarly received in upper die member 42. As best seen in FIG. 5, base plate 82 is secured to a platen 86 by means of machine screws, one of which is shown at 88.

A plurality of hollow cup strippers 92 are each secured by machine screws 94 to plate 54 for vertical movement, in plates 82 and 46, (FIG. 5). Each cup 92 is hollow to freely accommodate a cup 100. Plate 54 is biased upwardly by compression coil springs 106, one of which is shown in FIG. 5. Each compression coil spring 106 surrounds a screw 108 passing through cavity 112 in plate 82, threaded to plate 54 and having a head 110 to retain one end of spring 106. Adjustable stops 62 each comprise member 64 threaded through plate 54, adapted to engage plate 82, and having threaded thereto a lock nut 66.

The upper and lower die members described above differ in the application exemplified here in their design to cut each individual cup free from the associated web rather than blanking out the cups in groups of four as was done heretofor of necessity.

The upper die member 42 has been modified by adding manifolds 122 and 124 (FIG. 4) which are bolted to plate 44 by bolts indicated at 126 and 128 respectively. Manifold 124 comprises an entrance portion 130 and a portion 132. Manifold 122 has a slot 134 communicating with the interior of an affixed shoe member 136 having a base plate 138 having openings 140 across its entire face. Manifold 122 also communicates with manifold passages 142 in plate 44 which in turn also communicate with manifold 124. Each punch member 50 has vacuum openings 144 (FIG. 5) which are in communication with passage 146 surrounding the associated bolt 52 and which connect to the adjacent manifold passage 142.

A shoe member 152 (FIG. 4) which has openings 154 across its face is secured to the lower face of portion 132 of manifold 124 with communication between the shoe 152 and manifold portion 132 being provided by an elongated slot 156 in portion 132. Vacuum producing means (not shown) is connected to open end 158 of manifold 124 (FIG. 2) and to the open end 160 of manifold 122 (FIG. 2). A flexible hose 161 connects vacuum shoe 163 to connection 165 which communicates with manifold 122 (FIG. 4).

OPERATION

Figure 4:
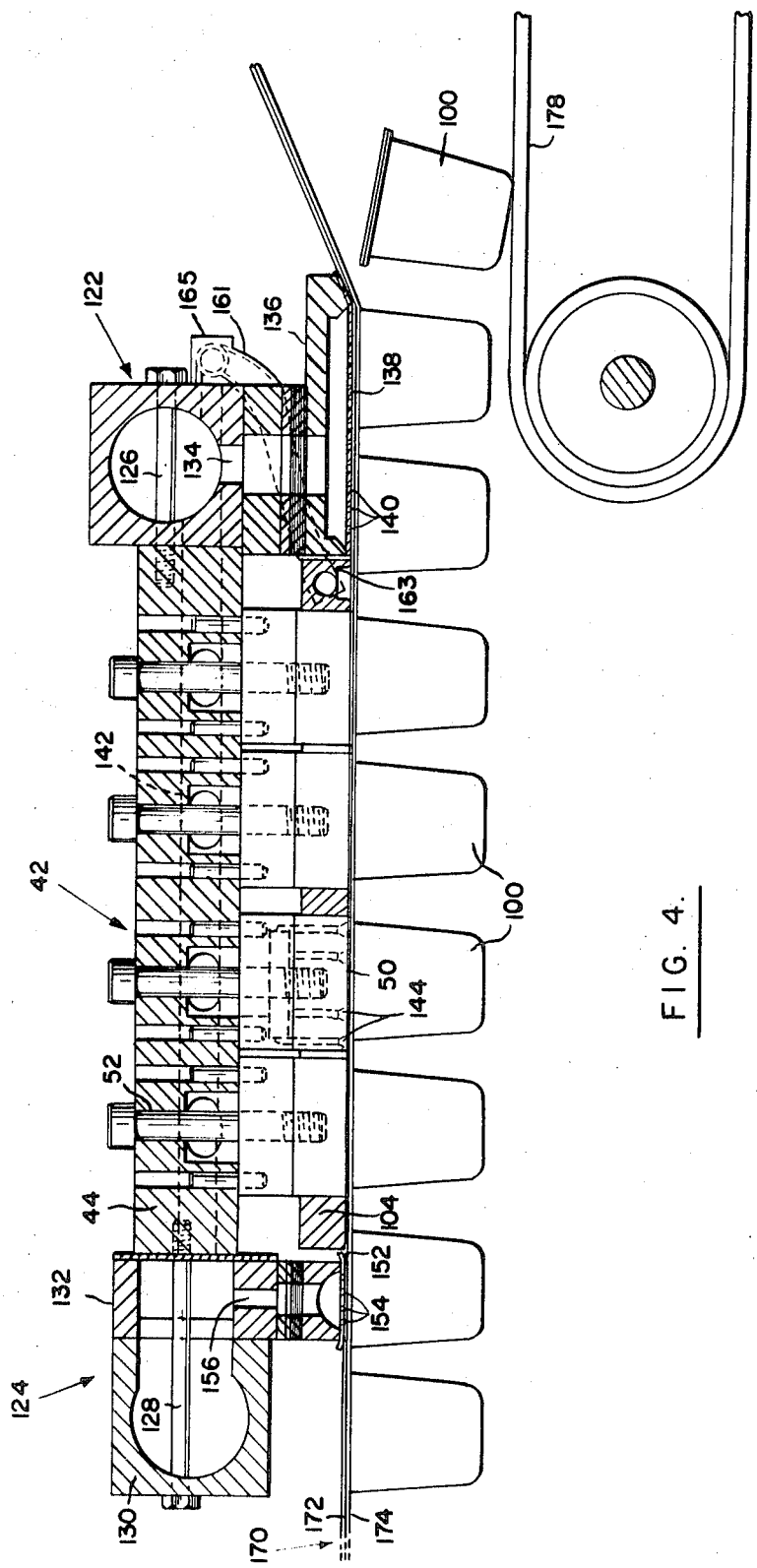
FIG. 4 is a vertical section taken on the planes indicated by the line 4—4 in FIG. 2.

In operation, the suction under shoe 152, the punch members 50 shoe 163 and shoe 136 hold web 170 comprising cover sheet 172, plastic sheet 174 and cups 100 therein upwardly against the upper die member 42 after the web is initially placed against the upper die member 42 (FIG. 4). The lower die member 84 moves upwardly in the usual manner carrying plate 82 and its associated die plate 46 upwardly which in turn through compression coil springs 106 and bolt 108 moves plate 54 and cup strippers 92 upwardly with plate 54 and cup strippers 92 being arrested when they engage web 170 which is against stripper plate 104 and the individual punches 50. With the cups 100 freely inside cups 92 and springs 106 being compressed, the die plate 46 can continue to move up until its cutting edges 96 move past the corresponding cutting edge 98 of the punches 50 to sever the individual cups from the cup supporting web 170. As the web 170 is engaged by plate 46, the corresponding stripper plate 104 is forced upwardly against the force exerted by the springs 56 which return the stripper plate 104 to its original position flush with the bottom of punches 50 when the lower die member 84 is withdrawn to strip off the waste portion of the web to the level of the cut-off portions on the cups 100. During the initial portion of this withdrawal, cups 92 are retained in contact with web 170 by virtue of compression coil springs 106 until the waste portion of web 170 is level with the top of the caps. After the withdrawal of lower die member 84 and with the web 170 and the now severed cups 100 still being retained as a unit by the above discussed suction, the web 170 is moved in a conventional manner to the right as viewed in FIG. 4 carrying with it each of the severed cups until the individual cups are clear of the suction of plate 138 and drop downwardly from the waste portion of the web 170 onto the endless conveyor 178. FIG. 4 illustrates the transferring operation from the upper die member 42 to the endless conveyor 178. The retaining of the severed cups and the waste portion of the web 170 as a unit by the vacuum not only permits the movement of the waste portion of the web 170 to move individual cups 100 to a position over the endless conveyor 178 but also provides for an orderly placement of the cups 100 on the conveyor.

I claim:

1. In a blanking machine having means to feed a continuous web to a blanking press which has a fixed upper die and a reciprocable lower die, a conveyor adjacent the upper die and means to remove the waste portion of the web, the improvement comprising:
    a plurality of punches fixedly mounted on the upper die,
    a spring biased stripper plate surrounding said punches, spring mounted on said upper die plate and having a normal position with its lower surface in the same plane as the lower faces of the punches,
    a die plate fixedly secured to the lower die for cutting cooperation with said punches,
    a second stripper plate adapted to engage the portion of the web overlying the punches and mounted for relative vertical movement with respect to the die plate,
    spring means connecting the second stripper plate to the lower die to bias the second stripper plate against the web as the lower die is moved upwardly and to retain it against the cut web during the initial downward movement of the lower die,
    manifold means for said upper die,
    means to exhaust air from said mainfold means,
    means forming downwardly extending passages in said punches communicating with said manifold to provide a suction across their lower faces,
    perforate shoe means adjacent the entrance and exit ends of the upper die member communicating with said manifold means to retain portions of the web to the upper die,
    said latter two means retaining the waste portion and the blanked out portions of the web as a unit until removed from the press by the removal of the waste portion of the web.

2. The machine of claim 1 in which the second stripper plate is hollow below each punch to accommodate a cup depending from the web.

* * * * *